United States Patent [19]

Fang et al.

[11] Patent Number: 5,737,212
[45] Date of Patent: Apr. 7, 1998

[54] FLAG SETTING CIRCUIT FOR MICROCONTROLLER

[75] Inventors: I Liang Fang; Kuo Cheng Yu; Jason Chen, all of Hsinchu, Taiwan

[73] Assignee: Industrial Technology Research Institute

[21] Appl. No.: 567,146

[22] Filed: Dec. 4, 1995

[51] Int. Cl.⁶ .................................................. G05B 19/048
[52] U.S. Cl. ..................... 364/130; 364/134; 364/136
[58] Field of Search ................................ 364/130, 131, 364/200; 395/750, 700, 500, 427, 575; 379/359; 340/825; 307/518; 371/62

[56] References Cited

U.S. PATENT DOCUMENTS

| | | | |
|---|---|---|---|
| 4,802,089 | 1/1989 | Shaw | 364/200 |
| 4,809,280 | 2/1989 | Shonaka | 371/62 |
| 4,847,616 | 7/1989 | Gotou et al. | 340/825 |
| 5,031,212 | 7/1991 | Saiji et al. | 379/359 |
| 5,315,184 | 5/1994 | Benhamida | 307/518 |
| 5,341,497 | 8/1994 | Younger | 395/575 |
| 5,446,864 | 8/1995 | Burghardt et al. | 395/427 |
| 5,454,114 | 9/1995 | Yach et al. | 395/750 |
| 5,455,937 | 10/1995 | Berman et al. | 395/500 |
| 5,504,903 | 4/1996 | Chen et al. | 395/700 |
| 5,541,943 | 7/1996 | Niescier et al. | 371/62 |

FOREIGN PATENT DOCUMENTS

| | | |
|---|---|---|
| 61-256053 | 10/1986 | Japan . |
| 63-191722 | 7/1988 | Japan . |
| 1-081859 | 3/1989 | Japan . |
| 2-139414 | 5/1990 | Japan . |
| 2-268500 | 10/1990 | Japan . |
| 3-248694 | 9/1991 | Japan . |
| 5-127329 | 5/1993 | Japan . |

*Primary Examiner*—Reba I. Elmore
*Assistant Examiner*—Monica Lewis
*Attorney, Agent, or Firm*—W. Wayne Liauh

[57] ABSTRACT

A flag setting circuit for a microcontroller, which can be set with a HALT mode flag and a watchdog timer overflow flag by using a system power-on signal, an external reset signal, a watchdog timer overflow signal inside the microcontroller, a clear instruction for watchdog timer, a HALT mode instruction, and a wake-up signal. The setting circuit for the watchdog timer overflow flag includes a reset signal generator, a watchdog timer, a clear signal generator, a flag clear circuit, and a register circuit. The setting circuit for the HALT mode flag includes a HALT mode discerning circuit, a flag clear circuit, and a register circuit. The frequency source of the watchdog timer is provided by means of a frequency from the system oscillator divided with four, or by using a frequency of RC oscillator built in the system. Under the HALT mode, the RC oscillator is selected. By means of the HALT mode flag and the watchdog timer overflow flag, the operation condition of the system hardware can be discerned.

6 Claims, 4 Drawing Sheets

| TO | PD | reset conditions |
|---|---|---|
| 0 | 0 | Power-on reset |
| U | U | RES pin-connecting reset (under normal execution) |
| 0 | 1 | RES pin-connecting reset (under HALT mode) |
| 1 | U | watchdog timer overflow (under normal execution) |
| 1 | 1 | watchdog timer overflow (under HALT mode) |

FIG. 5

FLAG SETTING CIRCUIT FOR MICROCONTROLLER

BACKGROUND OF THE INVENTION

1. Field of the Invention

This invention relates to a flag setting device for a microcontroller, and particularly to a flag setting circuit for setting a HALT mode flag and a watchdog timer overflow flag in a microcontroller, so as to discern the operation condition of a system hardware before making a proper action.

2. Description of the Prior Art

A conventional microcontroller usually uses and includes a zero flag Z, a carry flag C, an auxiliary carry flag AC, and an overflow flag OV. All the aforesaid flags are used for providing the microcontroller with an auxiliary judgment when executing software operation. For instance, the zero flag can set a flag in a flag register whenever the operation result is zero in a microcontroller; the carry flag C is used for showing a carry operation inside a microcontroller.

However, at the present time, the hardware condition inside a microcontroller is unable to show the user about the condition of the hardware for proper judgment. For example, the current microcontroller setup does not tell the system condition when the watchdog timer is under overflow, or the condition of a system before it is reset, so as to let the user take proper actions.

SUMMARY OF THE INVENTION

The primary object of the present invention is to provide a flag setting device for a microcontroller, whereby the system hardware condition can be indicated from time to time by using a flag.

Another object of the present invention is to provide a flag setting device, whereby a flag can be set in accordance with the signal condition inside a microcontroller so as to provide a user with [a] an inquiring method with a software to judge the hardware condition and use the same.

Still another object of the present invention is to provide a flag setting device, whereby a watchdog timer overflow flag and a HALT mode flag are set so as to discern the cause of system resetting, and to discern under what condition the system resetting is taking place. By means of the watchdog timer overflow flag and the HALT mode flag set according to the present invention, a user can discern the cause (the watchdog timer overflow resetting, or the external reset signal entered) of the system being reset, or under what condition the system is being reset (under normal operation or under HALT mode). Since the watchdog timer overflow flag and the HALT mode flag according to the present invention are added to the system, the user of a microcontroller can, by means of the aforesaid two flags, discern the operation condition of a system hardware before making proper action, i.e., a system can have a better performance than ever.

BRIEF DESCRIPTION OF THE DRAWINGS

FIG. 5 is a related list between the watchdog timer overflow flag and the HALT mode flag under different conditions according to the present invention.

DETAILED DESCRIPTION

Figure 1:
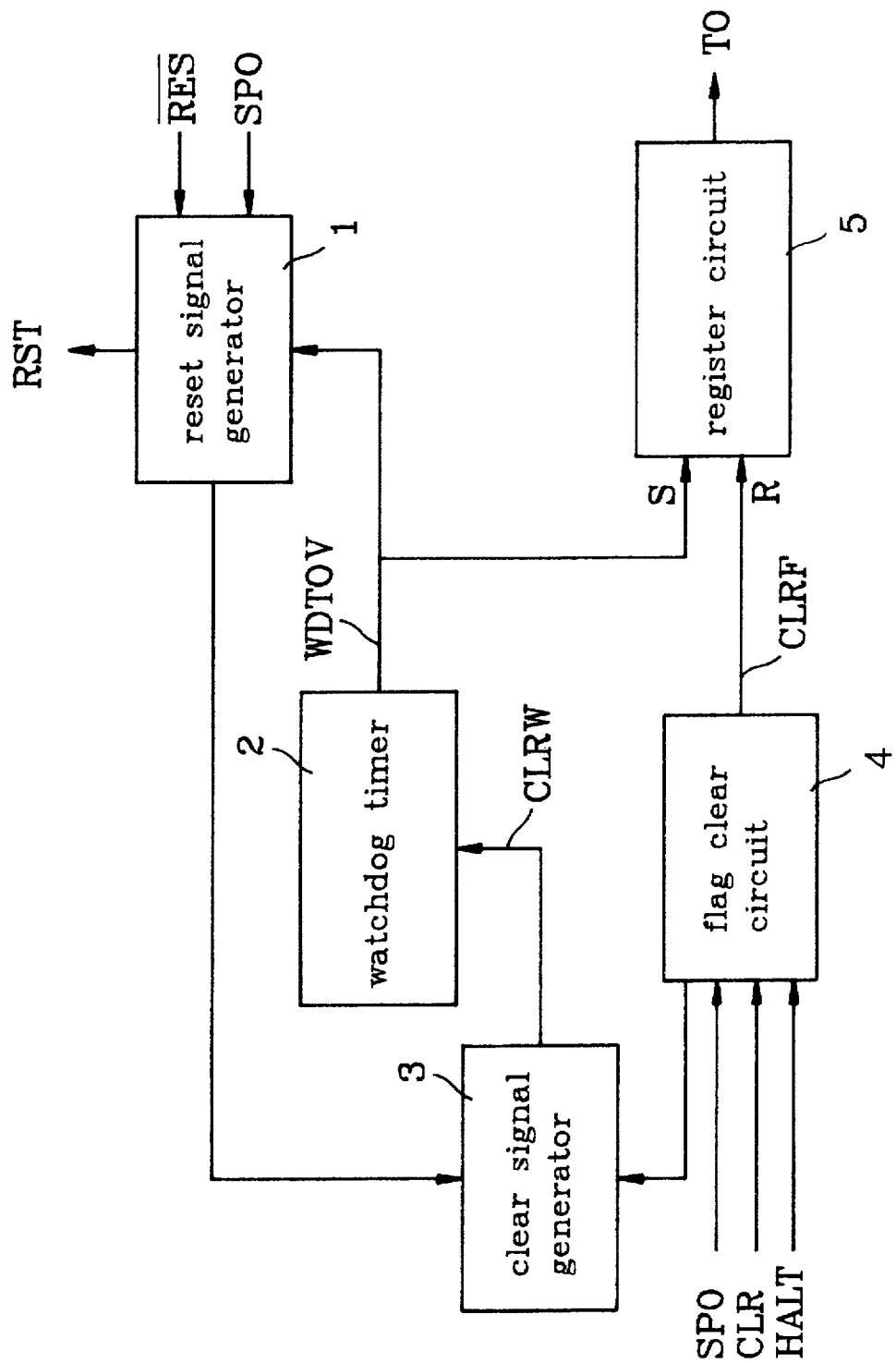
FIG. 1 is a block diagram for setting a watchdog timer overflow flag system according to the present invention.

As shown in FIG. 1, which is a block diagram showing a system of watchdog timer overflow flag being set according to the present invention; it comprises a reset signal generator 1, a watchdog timer 2, a clear signal generator 3, a flag clear circuit 4 and a register circuit 5.

The reset signal generator 1 is connected with an external reset signal $\overline{RES}$ and an SPO (system power-on) signal which are not output from the microcontroller, and is also connected with a WDTOV(watchdog timer overflow) signal so as to generate an internal RST (reset system) signal to reset the hardware of a system, and to reset the internal circuit of the system. In FIG. 1, the symbol $\overline{RES}$ stands for a reverse phase signal of the external reset signal.

The flag clear circuit 4 is connected with the signal SPO, a CLR (watchdog timer clear instruction) from the inside of the microcontroller, and a HALT (halt mode instruction) from the microcontroller system. The clear signal generator 3 is to be operated with a signal of RES from the reset signal generator 1, or with one of the SPO, CLR, HALT signals out of the flag clear circuit 4 so as to generate control signal CLRW for clearing the watchdog timer 2, and prevent the watchdog timer 2 from overflow. The output point of the register circuit 5 is used as an overflow flag TO of the watchdog timer 2. The reset input point "S" of the register circuit 5 is connected with the overflow pulse signal WDTOV from the watchdog timer 2, while the reset input point "R" thereof is to receive the flag clear signal CLRF from the flag clear circuit 4.

Figure 2:
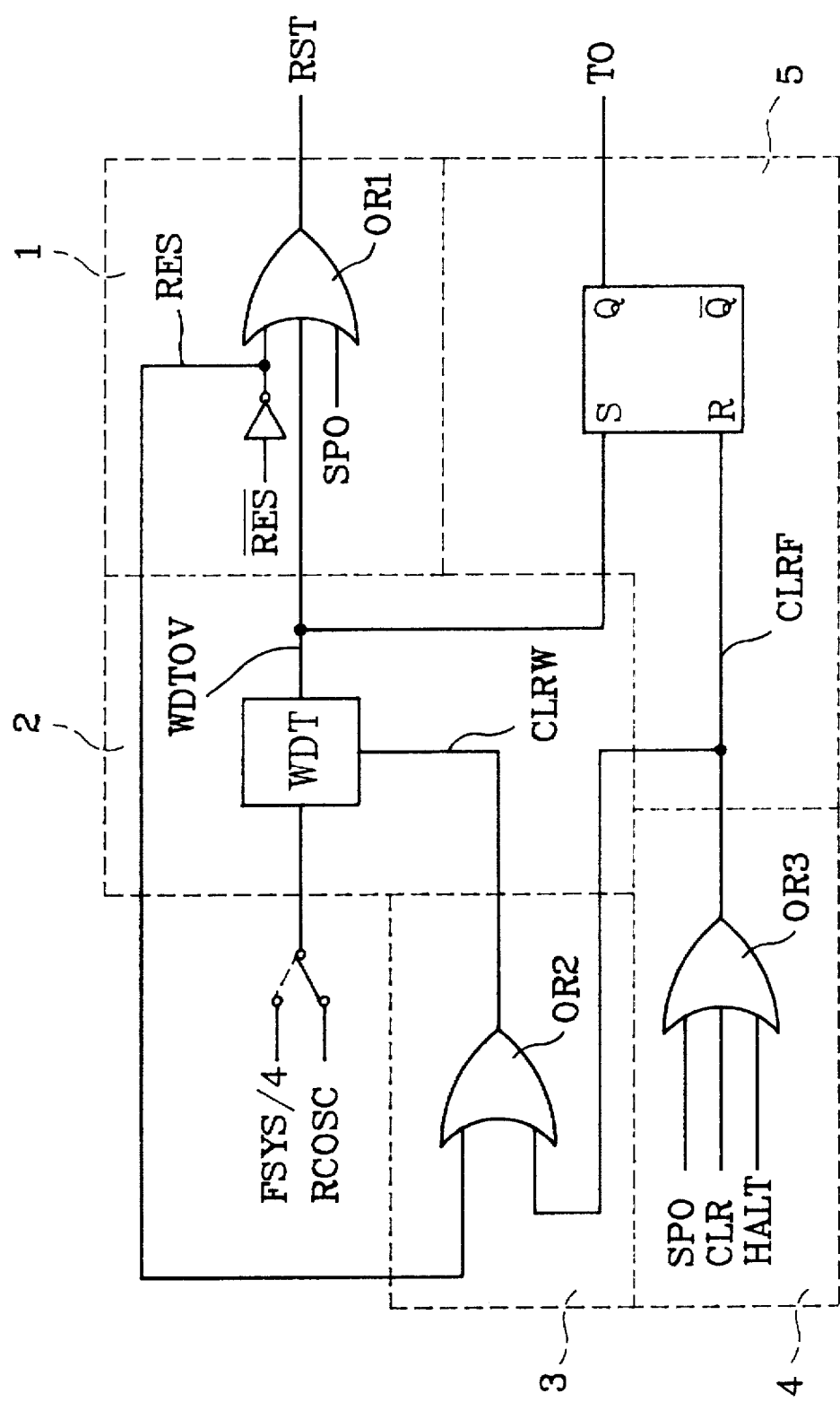
FIG. 2 is a preferred embodiment for setting a watchdog timer overflow flag according to the present invention.

FIG. 2 illustrates a preferred embodiment circuit for a system of the watchdog timer overflow flag TO, in which the watchdog timer 2 has two frequency sources: FSYS/4 and RC OSC.FSYS/4 stands for the frequency of the system oscillator divided with "4"; and RC OSC stands for the frequency of the RC oscillation built in the system. The main difference between the two aforesaid frequencies is that the system oscillator will not oscillate under HALT mode and the instruction execution frequency will be discontinued; then, the frequency of RC oscillator built in the system will continue to provide a frequency source for the watchdog timer 2. In other words, the frequency source will be switched to RC OSC under the HALT mode so as to allow the watchdog timer 2 continue to function continuously.

Referring to FIG. 1, when the watchdog timer 2 continues to count, if the microcontroller has no clear instruction to the watchdog timer 2, and if the watchdog timer 2 is under a state of overflow, the watchdog timer 2 will have an output of overflow pulse signal WDTOV to be sent to the input point "S" of the register circuit 5 (in this embodiment, the register circuit 5 is a flip-flop). The output point of the register circuit 5 is designed to provide an overflow flag TO. Simultaneously, the overflow pulse signal WDTOV, the external reset signal RES and the system power-on signal SPO are all to pass through an OR gate OR1 in the reset signal generator 1 to generate an internal reset signal RST of the reset system hardware, so as to reset the internal circuit of the system. In other words, when one or more than one of the aforesaid three signals (i.e., the overflow pulse signal WDTOV, the external reset signal/RES, or the system power-on signal SPO) are in a high state "1", the system will be reset.

After resetting, the user can discern, according to the watchdog timer overflow flag TO, whether the system reset is caused by an external reset signal input or by a watchdog timer overflow from the inner part of the microcontroller. Such condition is that the watchdog timer overflow flag would not change when the system being reset. The state of the flag remains unchanged so as to facilitate a judgment to be later.

In order to allow the user to discern the cause of system reset, and to clear the watchdog timer overflow flag TO reset, a control instruction for clearing the flag has been provided for next judgment. Furthermore, in order to maintain the independent nature and the specific function of the watchdog timer, the watchdog timer overflow flag TO can be cleared only upon the execution of the clearing the watchdog timer or upon the entering of the HALT mode so as to maintain the independent operation nature.

In order to fulfil the aforesaid object, a related instruction to the operation of the watchdog timer has to be used for clearing such flag. Therefore, the present invention is provided with a clear signal generator 3 and a flag clear circuit 4. The flag clear circuit 4 includes one OR gate OR3 with three input points. The first input point is connected to the system power-on signal SPO; the second input point is connected to an instruction CLR for clearing the watchdog timer inside the microcontroller; and the third input point is connected to the instruction to enter the HALT mode provided by the microcontroller system.

After the aforesaid three signals pass through the OR gate OR3, the OR gate will have an output signal, which will enter the input point of an OR gate OR 2 together with the reset signal/RES. The OR gate OR2 will have an output signal, i.e., a control signal CLRW for clearing the watchdog timer 2. Simultaneously, the output point of the OR gate OR3 will send out a flag clear signal CLRF to the reset input point "R" of the register circuit 5 so as to clear the watchdog timer overflow flag TO that was set previously.

Figure 3:
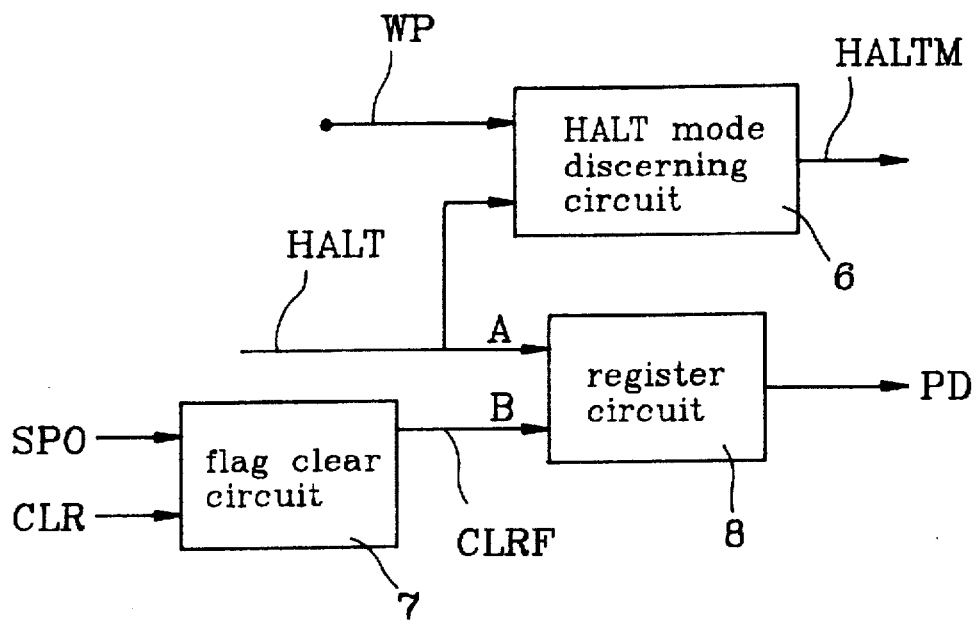
FIG. 3 is a block diagram for setting a HALT mode flag system according to the present invention.

FIG. 3 illustrates a system for setting a HALT mode flag PD according to the present invention; it includes a HALT mode discerning circuit 6, a flag clear circuit 7 and a register circuit 8.

Figure 4:
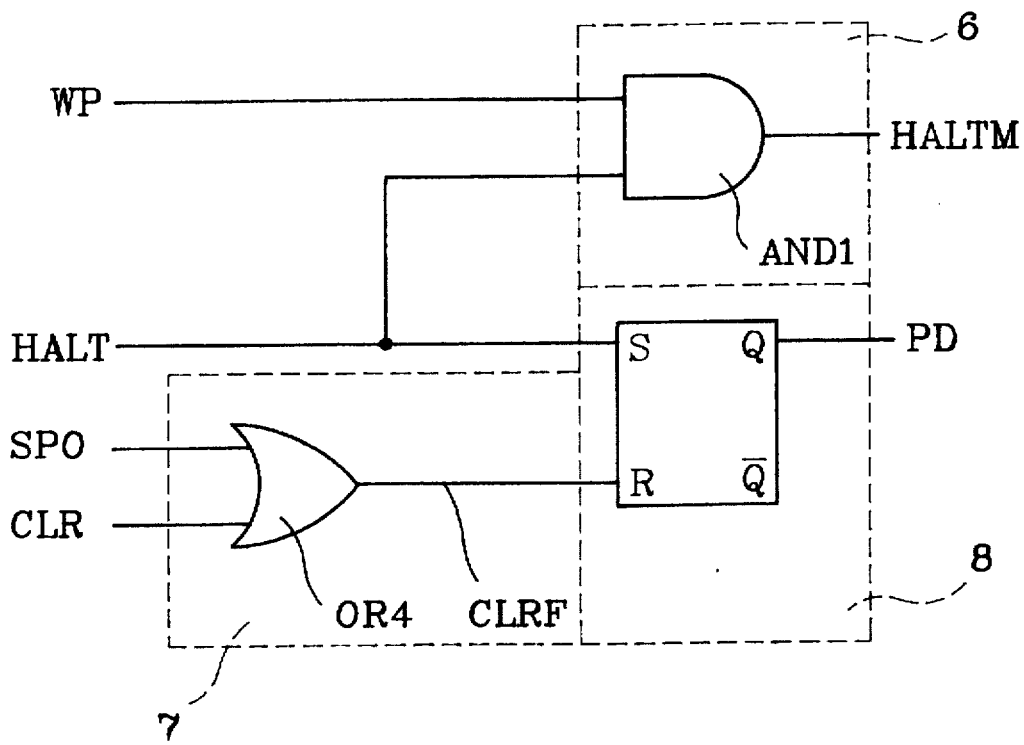
FIG. 4 is a preferred embodiment for setting a HALT mode flag as shown in FIG. 3.

FIG. 4 is a preferred embodiment circuit for the system as shown in FIG. 3. In the aforesaid circuit, the signals to be used in the microcontroller are the same as those in FIG. 2, and therefore the signals therein are marked with the same symbols. In this embodiment, the HALT mode discerning circuit 6 includes an AND gate AND1, of which one input point is connected to a wake-up signal WP from inside the microcontroller, while the other input point is connected to a HALT mode instruction HALT. After the HALT mode discerning circuit 6 receives the two signals WP and HALT, it generates a HALT mode instruction HALTM to cause the system to be set in the HALT mode. The output point of the flip-flop in the register circuit 8 is designed as the HALT mode flag PD according to the present invention.

Under the HALT mode, the oscillator does not have any oscillation, i.e., the FSYS/4 is zero. Under this condition, the watchdog timer stops to operate. If the frequency of the RC oscillator built in the system RC OSC is used, the watchdog timer is allowed to operate continuously because the frequency source is not affected by the system oscillator. When the watchdog timer selects the frequency of the RC oscillator built in the system RC OSC as a frequency source, the watchdog timer will, under HALT mode, continue to operate. Then, the watchdog timer will cause a condition of overflow. If the watchdog timer selects the frequency of RC oscillator built in the system FSYS/4 as a frequency source under HALT mode, the watchdog timer will stop to operate, and therefore no overflow condition will take place in the watchdog timer.

The HALT mode flag PD according to the present invention is to be set upon the HALT mode instruction HALT. When the HALT mode instruction HALT is being executed, the system will have the HALT mode flag PD set through the register circuit 8, and then the oscillator built in the system will be turned off so as to state the HALT mode. The oscillator will wait for a wake-up signal generated (which may be a reset wake-up signal from/RES, or a signal from the outside of the system) by the watchdog timer built in the system (during that time, the oscillating frequency source is that of the RC oscillator RC OSC). When the wake-up signal WP is in high state, the system will be waken up immediately, and the oscillator of the system will be turned on to oscillate, and the HALT mode will end.

As shown in the circuit, the wake-up signal and the external reset signal/RES will not affect the watchdog timer overflow flag TO and the HALT mode flag PD, but will discontinue the HALT mode. When the HALT mode instruction HALT is executed, a HALT mode control signal HALTM will be sent out of the HALT mode discerning circuit 6 to cause the system to enter the HALT mode. When the wake-up signal WP is in high state "1", the HALT mode will be ended. Under the HALT mode, the oscillator of the system will stop to operate, and the system stops to operate, too, so as to save electric power. After being waken up, the oscillator of the system will restore oscillation.

The flag clear circuit 7 includes an OR gate OR4 with two input points to be connected to the system power-on signal SPO and the watchdog timer clear instruction CLR, respectively. The output point of the OR gate OR4 sends out a flag clear signal CLRF to the reset input point "R" of the register circuit 5 so as to clear the HALT mode flag PD originally set. In other words, the HALT mode flag PD according to the present invention can be cleared by the output of the OR gate OR4 of the flag clear circuit 7. When one of the system power-on signal SPO or the watchdog timer clear instruction CLR inside the microcontroller is in high state "1", the HALT mode flag PD will be cleared to "0".

Abnormal wake-up signal is caused by the overflow of the watchdog timer, and the watchdog timer overflow would cause to set a watchdog timer overflow flag TO; the program will be reset. Under the HALT mode, the watchdog timer overflow is caused by the stop of the system, which is unable to clear the watchdog timer. Such condition is deemed distinct from that of unable to clear the watchdog timer because of the program out of control. The aforesaid conditions can be judged by the HALT mode flag and the watchdog timer overflow flag according to the present invention. A signal generated by the external reset signal/RES can also be judged with the aforesaid two flags (because of external reset signal/RES not affecting the aforesaid two flags.)

As soon as the system power is turned on, the watchdog timer overflow flag TO and the HALT mode flag PD will be cleared to zero state. When a reset signal is an external reset signal/RES, the aforesaid two flags would not be affected. The differences between the watchdog timer overflow flag TO and the HALT mode flag PD are the states of reset conditions as shown in FIG. 5, in which "1" stands for a logic high state, while "0" stands for a logic low state; "U" stands for the logic state unchanged.

The aforesaid watchdog timer overflow flag circuit and the HALT mode flag circuit are provided inside the microcontroller; the signals to be used by them are also provided in the microcontroller.

In brief, since the present invention has been added with the watchdog timer overflow flag and the HALT mode flag, a user can easily discern the operation condition of the hardware so as to take a proper action, i.e., the system will have a better performance and a higher industrial vale, and therefore it is deemed novel and patentable.

What is claimed is:

1. A flag setting circuit for a microcontroller for setting (a) a HALT mode flag and (b) a watchdog timer overflow flag by using a system power-on signal, an external reset signal, a watchdog timer overflow signal inside said microcontroller, an instruction for clearing said watchdog timer (i.e., a clear instruction control signal), a HALT mode instruction, and a wake-up signal; said flag setting circuit for setting said watchdog timer overflow flag including:

a watchdog timer, which is configured such that, when counting numbers, and when no clear instruction control signal to said watchdog timer is executed, but said watchdog timer has an overflow state, said watchdog timer will send out an overflow signal via its output point;

a first flag clear circuit, having input points able to receive said system power-on signal, said clear instruction control signal for clearing said watchdog timer, and said HALT mode instruction provided by said microcontroller system respectively, so as to generate a flag clear signal;

a clear signal generator, which has one input point for receiving an output signal from said flag clear circuit, and an output point for sending out said clear instruction control signal to said watchdog timer for clear the same;

a first register circuit, which has an input point connected to said output point of said watchdog to receive said watchdog overflow signal from said watchdog timer, and another input point connected to receive said flag clear signal from said first flag clear circuit, said first register circuit also has an output point for sending out a watchdog timer overflow flag;

a reset signal generator connected to said clear signal generator; said reset signal generator including two input points to receive an external reset signal and a system power-on signal, respectively, and an output point for sending out an internal reset signal to said clear signal generator, said reset signal generator further including another input point to receive said watchdog timer overflow signal from said watchdog timer, whereby, upon receiving said watchdog timer overflow signal from said watchdog timer, an internal reset signal will be generated for resetting a system hardware such that after said resetting, a judgment can be make, by means of examining said watchdog timer overflow flag, as to whether said system resetting is caused by using an external reset signal, or by using said watchdog timer overflow inside said microcontroller; and said flag setting circuit for setting said HALT mode flag including:

a HALT mode discerning circuit, which includes two input points connected respectively to receive said wake-up signal inside said microcontroller and said HALT mode instruction, said HALT mode discerning circuit also includes means for generating a HALT mode control signal to set said microcontroller system to a HALT mode;

a second flag clear circuit, which includes two input points connected respectively to receive said system power-on signal and said clear instruction control signal, which will be used for clearing said watchdog timer, and an output point for sending out a flag clear signal;

a second register circuit, which includes an input point connected to said flag clear circuit to receive a flag clear signal for clearing a HALT mode flag set, and an output point for sending out a HALT mode flag.

2. A flag setting circuit for microcontroller as claimed in claim 1, wherein frequency source of said watchdog timer is provided with a frequency of a system oscillator divided by four.

3. A flag setting circuit for a microcontroller as claimed in claim 1, wherein frequency source of said watchdog timer, under said HALT mode, is supplied with a RC oscillator built in said system.

4. A flag setting circuit for a microcontroller as claimed in claim 1, wherein said watchdog timer overflow flag can be cleared upon clearing said watchdog timer or upon entering of said HALT mode.

5. A flag setting circuit for a microcontroller as claimed in claim 1, wherein said first flag clear circuit includes an OR gate;

said clear signal generator also includes an OR gate; and said register circuit includes a flip-flop.

6. A flag setting circuit for a microcontroller as claimed in claim 1, wherein said HALT mode discerning circuit includes an AND gate.

* * * * *